United States Patent [19]

Hougen

[11] Patent Number: 4,871,287

[45] Date of Patent: Oct. 3, 1989

[54] ANNULAR CUTTER HAVING RADIAL CLEARANCE

[76] Inventor: Everett D. Hougen, Hougen Manufacturing Company, Inc. P.O. Box 2005, Flint, Mich. 48501-2005

[21] Appl. No.: 170,219

[22] Filed: Mar. 18, 1988

[51] Int. Cl.$^4$ ............................................. B23B 41/02
[52] U.S. Cl. .................... 408/204; 408/206; 408/223
[58] Field of Search ............... 408/204, 206, 207, 223, 408/224, 703; 51/288

[56] References Cited

U.S. PATENT DOCUMENTS

| | | |
|---|---|---|
| Re. 28,416 | 5/1975 | Hougen . |
| 3,765,789 | 10/1973 | Hoegen ............................ 408/703 |
| 4,693,644 | 9/1987 | Takahashi .......................... 408/703 |

Primary Examiner—Bruce Y. Arnold
Assistant Examiner—J. P. Ryan
Attorney, Agent, or Firm—Dykema Gossett

[57] ABSTRACT

The annular cutter of the present invention has a body portion with a plurality of teeth circumferentially spaced about the lower end thereof and a plurality of flutes extending upwardly around the outer periphery of the body portion between the teeth. Each of the teeth has at least two circumferentially stepped cutting edges with the trailing edge being the outermost cutting edge. These two cutting edges are separated by a shoulder which in the preferred embodiment is defined by the bottom wall of the flute. This shoulder has a radial clearance adjacent the outermost cutting edge to accommodate the growth of the outermost chip cut by the outermost cutting edge to facilitate discharge of the chips through the flute.

25 Claims, 4 Drawing Sheets

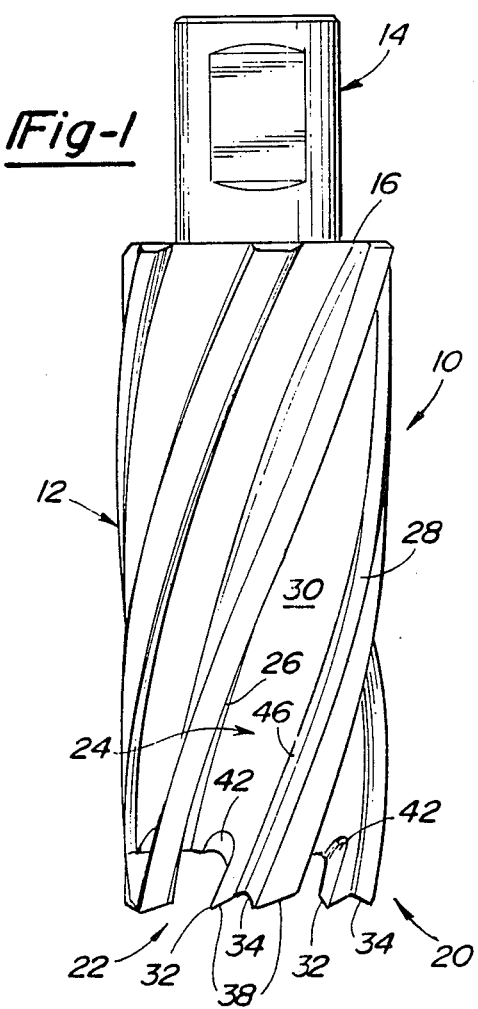
Fig-1
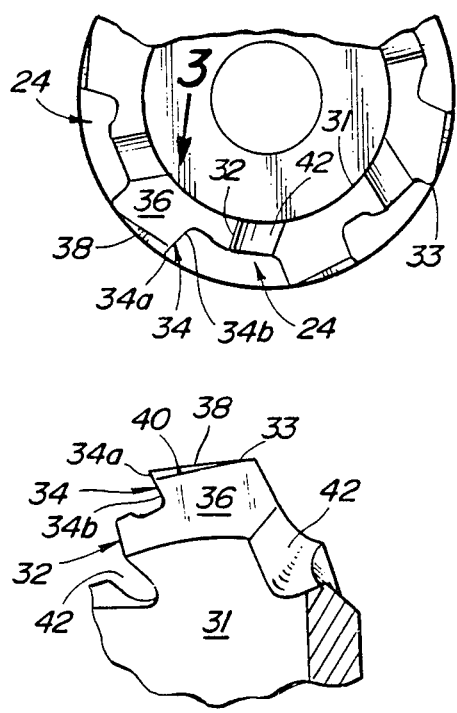
Fig-2
Fig-3
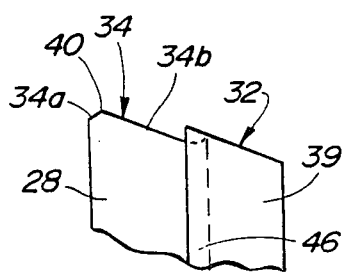
Fig-5
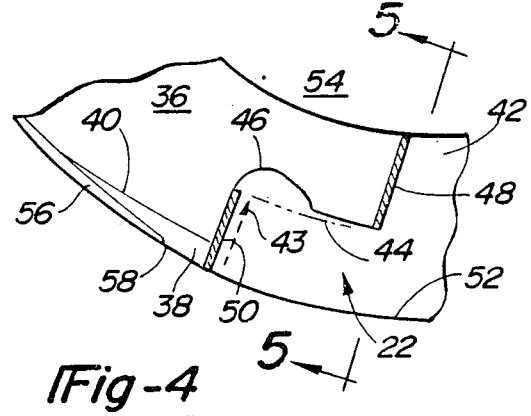
Fig-4

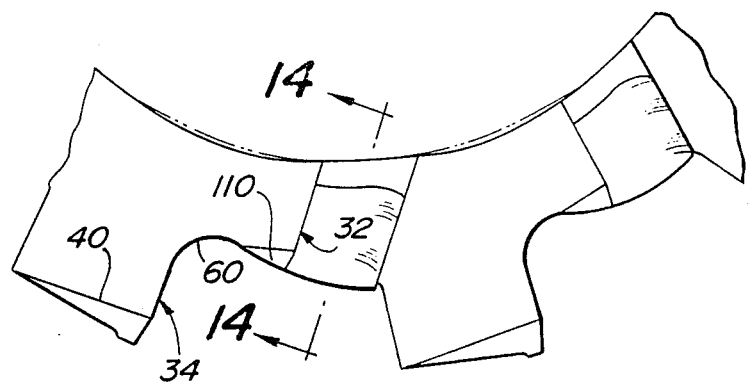
Fig-13
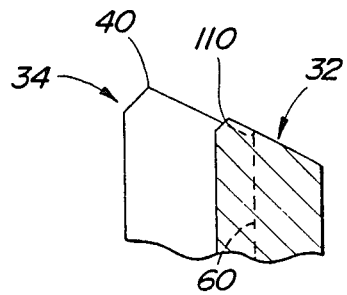
Fig-15  Fig-14
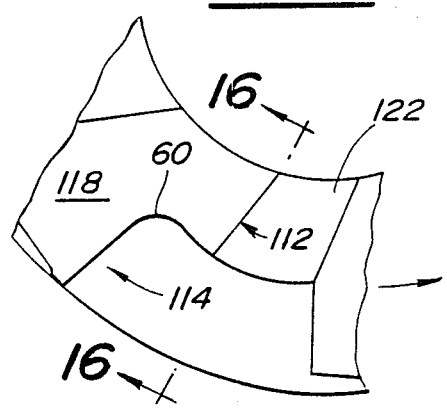
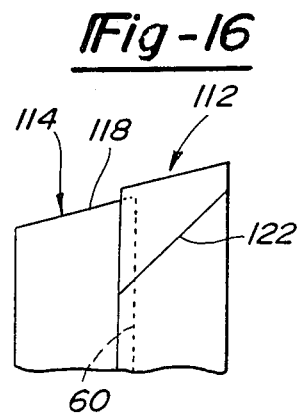
Fig-16

1

ANNULAR CUTTER HAVING RADIAL CLEARANCE

BACKGROUND OF THE INVENTION

The present invention relates to annular cutters for use in cutting holes in a workpiece, preferably a metal workpiece. More particularly, the present invention relates to an improved annular cutter which cuts holes more efficiently than previously known cutters because of its ability to discharge chips more effectively. As is known, annular cutters cut a hole in a workpiece by cutting an annular groove or kerf into the workpiece with an axial central slug of material remaining after the hole is cut. The cutting teeth of the annular cutter continually remove material from the bottom of this kerf in the form of chips which are discharged through flutes formed in the body of the annular cutter, generally in the exterior of the body.

Experience has shown that the life and the efficiency of an annular cutter (i.e. the ease and the number of times in which it can cut holes in metal workpieces and the finish produced by the annular cutter in the metal workpiece) are to a very large extent dependent upon the ability of the cutter to discharge the cut material or chips through its flutes or discharge passages. When the chips formed by an annular hole cutter cannot move freely away from the cutting edges or the flutes become packed or clogged with chips, the torque and thrust required to feed the cutter increases, the cutter wears more rapidly and the finish of the hole deteriorates. This is due primarily to the chips congesting between the cutting edges and the workpiece, creating excessive frictional heat build-up which results in cutting edge abrasion and damage to the sidewall of the hole being cut.

The applicant of the present invention recognized the need for free chip discharge and has invented several patented annular cutters which discharge chips more freely.

In applicant's U.S. Pat. No. 3,609,056 ('056), an annular cutter is disclosed wherein each tooth cuts a single chip. The successive teeth are divided into groups of three with each tooth in each group cutting a chip having a width of about one-third the width of the tooth. A thickened portion 18 is provided to facilitate the discharge of chips by providing a clearance area 104. This clearance area 104 provides an escape passage which becomes progressively wider in an outer direction.

The '056 cutter has been successful in improving efficiency and cutter life by improving chip discharge, but the design sacrifices speed because each tooth cuts only one-third of the kerf as compared to an annular cutter having each tooth cutting the entire kerf.

Recognizing this disadvantage, Applicant invented the annular cutter of U.S. Reissue Pat. No. Re 28,416 ('416). The '416 patent discloses an annular cutter wherein each tooth is formed with at least two radially-extending, circumferentially-staggered cutting edges. The cutting edges are designed so that each cutting cuts a chip from the kerf with a slight overlap of the cutting edges so that the entire kerf is cut by each tooth. As will be understood, this cutter will cut a hole faster than the '056 patent if the same number of teeth are used on both cutters.

The radially innermost cutting edge of the cutter disclosed in the '416 patent extends radially across the shallow gullet formed in the web between successive teeth, and the outermost cutting edge extends radially across the trailing wall of the flute which extends spirally upwardly of the cutter between successive teeth. Both the flute and the web have a thickness equal to about one-half the thickness of the annular wall of the cutter. These two cutting edges are separated circumferentially by the bottom wall of the flute which, in the embodiment disclosed in the '416 patent, is inclined slightly in a radially inward direction so that the cutting edges overlap radially a slight extent to cut two separate chips or at least a chip which fractures easily into two chips. This slight incline is illustrated in FIG. 4 of the '416 patent. The incline begins at 38 and extends back to 39. As can be seen, the end 48 of cutting edge 22 slightly overlaps the end 39 of cutting edge 24.

The cutter disclosed in the '416 patent produces cutting actions which are far superior to cutters previously used and to this day is extremely successful. However, it was found that when the cutter described in the '416 patent was used to cut holes on a production basis, high speeds and heavy usage, there is a tendency for the chips to clog and not move as freely as desired. This causes the cutting action to be much slower, and tapered, oversized holes are produced with a coarse finish. Further, the life of the cutter is shortened, and the cutter may be broken in heavy use.

It was then determined by applicant that the most practical way of overcoming the disadvantages of '416 patent, while maintaining its advantages, was to design a cutter which would produce thin, narrow chips that could be easily directed into the flute as soon they were cut. It was believed by the applicant that a wide chip would not bend readily and would occupy a relatively large volume; therefore, if a chip was narrow, it would encounter less obstruction in being discharged. Further, it was known that as the size of the flute is reduced, the strength of the cutter is increased since the web between the successive teeth is thicker.

To obtain the advantages of a thinner chip and a stronger cutter, applicant invented the cutter described in U.S. Pat. No. 4,452,554 ('554) which has a plurality of at least three cutting edges on each tooth. Each of these cutting edges has a radial dimension substantially less than one-half the wall thickness and preferably equal to about one-third the wall thickness. In this way, the radial dimension of the flute could be as small as about one-third the wall thickness and still sufficiently deep to freely accommodate the chip cut by the widest cutting edge.

The annular hole cutter disclosed in applicant's '554 patent has proven to be a commercial success having substantial advantages over previously known cutters, including improved efficiency and tool life. However, it was discovered there was still a problem with clogging at high speeds and heavy usage encountered in certain industrial applications. It was discovered that the problem was due to the chip that was cut by the outer cutting edge. When the outer cutting edge cuts a chip, the chip may become wedged between the inner wall of the hole being formed and the shoulder defined between the stepped teeth. In cutters having circumferentially staggered cutting edges, the outer cutting edge terminates at its radially inner end against the circumferentially extending shoulder of the cutter and terminates at its radially outer end at the inner wall of the hole being formed. If the chip cut by this outer cutting edge is not narrower than this chip passage are defined between the shoulder and inner wall, the chip may become wedged.

It was a limitation of both the '416 and '554 patents that regardless of what changes were made to the flute depth to accommodate the inner chip, the chip cut by the outer edge was wedging between the shoulder and the inner wall of the hole.

After extensive experimentation and investigation, it was discovered by applicant that this interference at the outer chip resulted primarily from three factors working separately or in combination, namely: (1) the generated chip width is greater than the chip passage or flute depth adjacent the cutting edge, (2) chip expansion after the chip is cut and (3) radial movement of the chips as they are cut, this movement being primarily radially inward movement.

The total or actual width of the cutting edge of the tooth will be equal to the kerf width of that edge, i.e. the path being cut by that edge, only when that edge is straight and perpendicular to the axis of rotation of the annular cutter. Any other form of cutting edge, such as straight but not perpendicular to the axis of rotation or crested, etc. will have a total width greater than the kerf width cutting a chip having a generated width which is greater than the kerf width. Typically, larger generated chip widths will occur in cutters having crests. With reference to the '554 patent, the outside cutting edge 38 has a crest 60 which is defined by the intersection of the back-off faces. Cutting edge 38 will cut a chip which is initially bent, but which will flatten immediately after it is cut. Previously, it was believed that these chips did not flatten, but rather the chips folded so that they could easily flow between the passage defined by shoulder 28 and the inner wall of the hole being cut.

Chip expansion is believed by the applicant to be due to linear deformation of the chip with resultant lateral or radial expansion of the chip. This chip expansion is believed by applicant to be dependent upon the feed rate and the geometry of the teeth, wherein a greater feed rate results in a thicker chip which expands radially more than a thinner chip. It has been found in testing that a tooth having a flat cutting edge defined by an acute angle of 15 degrees and kerf width of 0.140 inches, for example, will cut a chip having a radial width of 0.152 inches for mild low-carbon steel at a feed rate of about 0.007 inches per tooth. This is 0.012 inches wider than the kerf width. In a cutter having crested teeth, the chip expansion is somewhat less; however, the generated width of the chip, due to the crested teeth, will still give a substantially wider chip than the kerf width.

Finally, it has been found in testing that chips are normally generated inwardly with an annular hole cutter, toward the axis of the cutter, resulting in further interference.

The above problems were resolved in U.S. Pat. No. 4,632,610 ('610) issued to the inventor of the present application. In the '610 patent, portions of the cutting edges of pairs of teeth were alternately relieved in such a way that the kerf was further subdivided. The outer chip, for the first time, was narrower than the adjacent chip passage. While this greatly enhanced the efficiency and cutting ability of the tool, especially in heavier feeds and deeper holes, it complicated the construction of the tool and made it more difficult to manufacture and resharpen. Although the cutter disclosed in the '610 patent has proven to be a commercial success, the applicant continued to seek a simpler solution to this very difficult problem.

The present invention solves the problem of chip wedging at the outer tooth, while maintaining a design that is simple to manufacture and resharpen. Further, the present invention may be utilized on any annular hole cutter having adjacent teeth which are circumferentially spaced so that a shoulder is defined between the cutting edges, and the cutting edges form two separate chips.

SUMMARY OF THE INVENTION

The annular cutter of the present invention has a body portion with a plurality of teeth circumferentially spaced about the lower end thereof and a plurality of flutes extending upwardly around the outer periphery of the body portion between the teeth. Each flute is defined by a leading and trailing side wall and a bottom wall, and the teeth are configured to cut a plurality of chips which, when cut, are fed into the flutes.

In the preferred embodiment, each of the teeth has at least two circumferentially stepped cutting edges, one cutting edge is formed at the bottom of the trailing side wall with the other cutting edge spaced circumferentially forwardly and formed in the web portion of the annular cutter. The web portion is defined by the remaining portion of the body wall after the flute is formed and is approximately one-half the thickness of the cutter side wall. However, it should be understood that any cutter tooth configuration which employs at least two cutting edges which cut two separate chips will benefit from the present invention. In this regard, Applicant's prior inventions disclosed in U.S. Pat. Nos. Re 28,416 4,452,554 and 4,632,610 would benefit from this invention.

The cutting edges of each tooth are separated by a wall or shoulder which in the preferred embodiment is the bottom wall of the adjacent flute. The first cutting edge leads the second edge as said cutter is rotated, with each cutting edge cutting a separate chip. The chips cut have a radial width when cut which is at least equal to the radial width of the respective cutting edges.

As explained above, these chips when cut are at least as wide as the cutting edge and will generally be greater than the radial width of the cutting edge if the chip flattens or expands. Further, the chips may move inwardly toward the axis of the cutter. To accommodate for these factors, and to facilitate the discharge of chips, a radial clearance communicating with the adjacent flute is provided radially adjacent the second trailing cutting edge. This radial clearance receives a portion of the radial width of the chip as the chip is formed by the trailing cutting edge to facilitate the unobstructed feeding of the chip into the adjacent flute. Preferably, the radial clearance is radially adjacent the trailing wall and extends radially inwardly into the bottom wall of the adjacent flute forming a secondary chip passage which communicates with the adjacent flute. The radial clearance extends axially from the bottom or lower end of the cutter towards the upper end of the cutter. In one embodiment, the radial clearance extends the full length of the flute with the flute having a substantially uniform depth along the length of the cutter. In another embodiment, the radial clearance extends part way up the annular cutter to a point where the flute is deepened to the depth of the radial clearance.

Preferably, to sufficiently accommodate for flattening, expansion and movement of the chip, the radial depth of the radial clearance should be between about 0.010 and 0.025 inches, with the higher dimension being dependent on the wall thickness of the cutter with even higher radial depth permissible with wider wall thickness, and the circumferential width should be about 0.010 or at least wider than the thickest chip cut. Further, in the preferred embodiment, the radially outermost corner of the leading cutting edge is beveled to prevent fracturing of that corner. It has been found that this corner is subjected to considerable forces and that fracturing of the corner sometimes results. To prevent this, the exposed corner is beveled upwardly from the lower end and rearwardly from the cutting edge. This minimizes or eliminates the cutting on the vulnerable corner, as the cutting at this area is done by the inner end of the trailing edge.

As referred to above, many different cutting geometries would benefit from this invention. Included within these is what is known as a stacked geometry which is used to cut holes in stacked metal workpieces, e.g. a plurality of metal plates, wherein the hole is cut generally perpendicular to the planes of the plates. A typical annular hole cutter cannot cut through stacked workpieces because of the configuration of the slug being formed. Typical annular hole cutters have the outermost cutting edge axially lower than the innermost cutting edge. When the annular hole cutter penetrates the first work surface, the outermost cutting edge is the first to break through, and there is a small lip or flange which remains on the inner slug. As will be understood, when cutting through stacked materials, this flange prevents the inner cutting edge from engaging the next workpiece. The slug merely rotates within the annular cutter against the surface of the next workpiece with the flange shielding the inner cutting edges from penetrating the lower work surface.

When stacked workpieces are to be cut, a stacked geometry cutter is employed. Briefly, in a stacked cutter, the innermost edge is axially lower than the outermost edge. In this way, the inner cutting edge is the first to break through the material without the resultant flange, and the inner cutting edge is the first to enter the next workpiece with the outer cutting edge following. The radial clearance and/or axial relief of the present invention is even more useful in stacked cutter geometries for the same reasons as in standard annular cutters, and because the chips are directed inward more toward the shoulder because of the inclination angle.

The present invention further involves a preferred simplified method for manufacturing annular hole cutters employing the radial clearance or radiused flute of the present invention. This method uses a specially dressed grinding wheel to simultaneously grind the flute and the radial clearance into a cutter blank. The contour comprises a raised surface beginning on one side of the periphery of the grinding wheel which ends in a generally concave portion. During grinding, the grinding wheel is rotated at a high speed about its axis of rotation. The cutter blank is simultaneously rotated about its center line and moved axially with respect to the grinding wheel to grind the flutes into the side of the cutter blank. The side of the grinding wheel adjacent the raised portion forms the outermost cutting edge of the annular cutter and the trailing wall of the flute with the raised portion and periphery of the grinding wheel forming the radial clearance and bottom wall of the flute. The opposite side of the grinding wheel forms the leading wall of the flute. After the flutes have been cut into the body, a gullet is cut into the web of the annular cutter to form the innermost cutting edge. After completing these two passes, the cutter geometry, i.e. cutting edges, is ground onto the lower end of the cutter. In the most preferred embodiment, the raised portion on the grinding wheel is approximately 0.015 to 0.020 inches in radial height, and the concave portion of the grinding wheel has a radius of between about 0.15 to 0.30 inches.

BRIEF DESCRIPTION OF THE DRAWINGS

FIG. 1 is a plan view of the annular cutter of the present invention.

FIG. 2 is a partial end view of the cutter of FIG. 1 taken along line 2—2.

FIG. 3 is a partial perspective view of the cutter of FIG. 2 taken along line 3.

FIG. 4 is a partial end view of one tooth illustrating the radial clearance of the present invention and its function.

FIG. 5 is a partial front view of the inner and outer edges of a single tooth taken along lines 5—5 of FIG. 4.

FIG. 13 is a partial end view of the lower portion of the annular cutter illustrating a further embodiment thereof.

FIG. 14 is a side view of the annular cutter of FIG. 13 taken along line 14—14.

FIG. 15 is a partial end view of the lower portion of a further embodiment of the annular cutter of the present invention.

FIG. 16 is an end view of the cutting edges of one tooth of FIG. 15 taken along line 16—16.

DETAILED DESCRIPTION OF THE INVENTION

Figure 6:
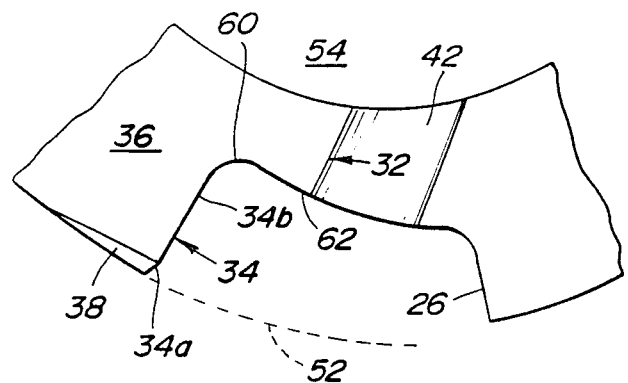
FIG. 6 is a partial end view of a further embodiment of the present invention.

With reference to FIG. 1, the annular hole cutter of the present invention is shown generally at 10. Cutter 10 includes an annular or tubular body portion 12 with a solid shank 14 mounted at the upper closed end 16 of the body and a plurality of circumferentially spaced cutting teeth 22 formed at the lower end 20 of the cutter. Flutes or chip discharge passages 24 extend from the lower end 20 to the upper end 16 of body 12. The flutes 24 are defined by a leading wall 26, a trailing wall 28 and bottom wall 30. Preferably, the flutes 24 have a depth of slightly greater than one-half the thickness of body 12. In the disclosed preferred embodiment, the flutes extend spirally upwardly into the cylindrical body of the cutter, but axial flutes may also be used.

With reference to FIG. 2, the inner wall of tubular body 12 is indicated at 31, and the outer wall is indicated at 33. As can be seen, flute 24 has a radial depth which is slightly greater than one-half the thickness of the body between the inner and outer walls 31 and 33 respectively. A web portion 25 is defined by the remaining wall area between bottom wall 30 of flute 24 and the inner wall 31 of the annular cutter. See FIG. 10. Preferably, this web portion is less than one-half the thickness of the body portion 12.

The cutting teeth 22 have at least two circumferentially spaced cutting edges, an inner cutting edge 32 and an adjacent outer cutting edge 34. As used herein, "inner" and "outer" refer to the relative radial positions of the cutting edges to the axis of the annular cutter. The "inner cutting edge" is the radially inwardly adjacent cutting edge and the outer edge is adjacent the inner wall of the hole being cut. As will be understood, the cutter teeth may have two or more cutting edges. The cutting edges 32 and 34 are defined by back-off faces or clearance surfaces 38 and 36. More specifically, the outer cutting edge 34 is defined by the intersection of back-off faces 36 and 38 with the trailing wall 28 of flute 24, and the inner cutting edge 32 is formed by notching the web portion 25 to form a surface 39 which intersects back-off face 36; see FIG. 5. Both the trailing wall 28 and surface 39 are inclined at a slight angle from vertical. Back-off face 36 inclines rearwardly and upwardly in the direction of the upper end 16 of the cutter at an angle of approximately 6 degrees and radially inwardly at an angle of approximately 20 degrees. This radially inward inclination is best shown in FIG. 5. The back-off face 38 also inclines rearwardly and upwardly at an angle of approximately 6 degrees from the cutting edge 34 and radially outwardly at an angle of approximately 15 degrees. It should be understood that these values are in no way intended to limit the scope of this invention and that these values may change depending upon operating conditions.

The line of intersection between the back-off faces 36 and 38 defines a crest 40 which also divides outer cutting edge 34 into outer and inner edges 34a and 34b respectively. Cutting edge 34 is axially lower than edge 36 so that crest 40 contacts the work surface initially to guide the annular cutter into the metal workpiece to make hole starts easier. To facilitate discharge of the chip cut by inner cutting edge 32 and to direct that chip into flute 24, a gullet or chip passage 42 is provided.

The inner and outer cutting edges 32 and 34 respectively are separated circumferentially by a shoulder 44. This shoulder 44 is defined by the bottom wall 30 of flute 24. Extending radially inwardly into shoulder 44 is a radial clearance or clearance 46. This radial clearance has a sufficient radial depth and circumferential width to accommodate chip 50 which is cut by outer cutting edge 34. As described above, chip 50 has an initial radial width defined by the radial length of cutting edge 34. Immediately upon being cut, chip 50 generally increases in its radial width because of flattening from its bent position due to crest 40 and from expansion. This is shown in FIG. 4 by the dotted portion of chip 50. Additionally, the chip may move radially inwardly in the direction of radial clearance 46. This is shown by the arrow 43 in FIG. 4. Without space 46, the chip will wedge between shoulder 44 and the inner wall 52 of the hole being formed.

The applicant has discovered that the radial width 46 is preferably between about 0.015 to 0.020 inches, and the circumferential width of radial clearance 46 is at least about 0.01 inches, regardless of the dimensions of the cutter, the cutter speed and the material cut. The precise reasons why this relationship holds true are not fully understood. However, it has been discovered that a radial depth of about 0.015 to 0.20 inches for the radial clearance is sufficient to avoid binding and clogging, as described above.

As described above, the chip 48 cut by inner cutting edge 32 also increases in size upon being cut; however, this is not a problem in the cutter of this invention because chip 48 is free to grow in a radial direction into the area between shoulder 44 and inner wall 52 of the hole being cut. Further, the chip will tend to move away from the slug 54 as the chip is being cut and be directed into flute 24 by gullet 42. Since the flute is slightly deeper than one-half the wall thickness of the annular cutter, the chip 48 will have a radial width, even after growth due to the above factors, which is less than the depth of the flute. Thus, unimpeded discharge of chip 48 is achieved, resulting in improved efficiency of the cutter and tool life.

As will now be understood by those of ordinary skill in the art, radial clearance 46 provides for unimpeded discharge of the chips during the cutting process. The inner cutting edge 32, as explained, has a radial width less than the radial depth of the adjacent flute 24 because the radial dimension of edge 32 is dependent on the depth of the flute 24. The chip 48 cut by edge 32 thus has a radial width which, even after growth, is less than the radial depth of flute 24. Because of the sizing of the inner cutting edge 32 and flute 24, outer cutting edge 34 has to have a radial width greater than the radial width of inner cutting edge 32 and equal to the depth of flute 24. Without the radial clearance 46 of the present invention, chip 50 would clog between shoulder 44 and inner wall 52 of the hole being formed. Further, chip 50 would bind the entire length of flute 24 and impede the flow of chip 48. Radial relief 46 eliminates this problem by deepening flute 24 to accommodate chip 50 without affecting the radial width of either cutting edge. In this way, chips 48 and 50 can flow unimpeded through flutes 24.

In the preferred embodiment, the cutter illustrated in FIGS. 1–5 includes an outer relief area 56 which defines an outer margin 58. This outer margin and relief provide a better finish to the annular hole being formed as described in applicant's U.S. Pat. No. 4,322,188, which is incorporated herein by reference. Additionally, it is preferred to have an inner relief and margin (not shown) on some or all of the cutting teeth as described in applicant's U.S. Pat. No. 4,538,944 which is also incorporated herein by reference.

With reference to FIG. 6, another preferred embodiment of the present invention is illustrated. In this embodiment, like elements have the same number designation as those in the previous embodiment. The main difference between the annular cutter illustrated in FIGS. 1–5 and the annular cutter illustrated in FIG. 6 is the configuration of the radial clearance. In the previous embodiment, the radial clearance 46 was shaped more as a channel, which began at the inner terminus of cutting edge 34 and ended in shoulder 44. In this preferred embodiment, radial clearance 60 is more radiused and ends in a convex or smoothly rounded shoulder 62. In this embodiment, the radial depth and circumferential width of radial clearance 60 may be substantially the same as radial clearance 46.

The reason the embodiment of FIG. 6 may be preferred is due to the method which the radial clearance is formed. The embodiment of FIG. 6 is more easily manufactured than the embodiment of FIGS. 1–4. In manufacturing the annular cutters of the preferred embodiment, the flute 24, cutting edge 34 and radial clearance 60 are all formed with one pass of a specially contoured grinding wheel 92. In contrast, the embodiment of FIG. 4 requires one pass of the grinding wheel to form the cutting edge 34 and flute 24 and then a second pass of another grinding wheel to form the radial clearance 46. This additional step requires greater time and effort and increases the cost of manufacturing the annular cutter.

Figure 11:
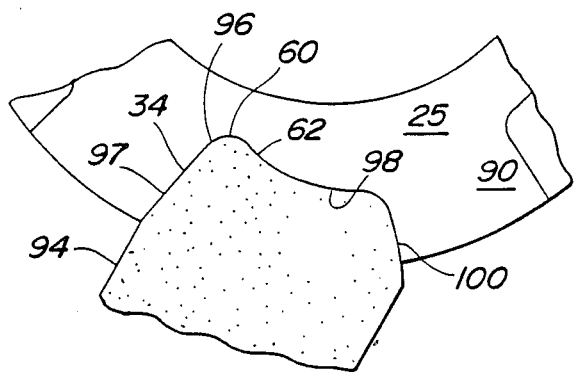
FIG. 11 is a partial end view of the lower portion of the annular cutter illustrating the method of FIG. 12.
Figure 12:
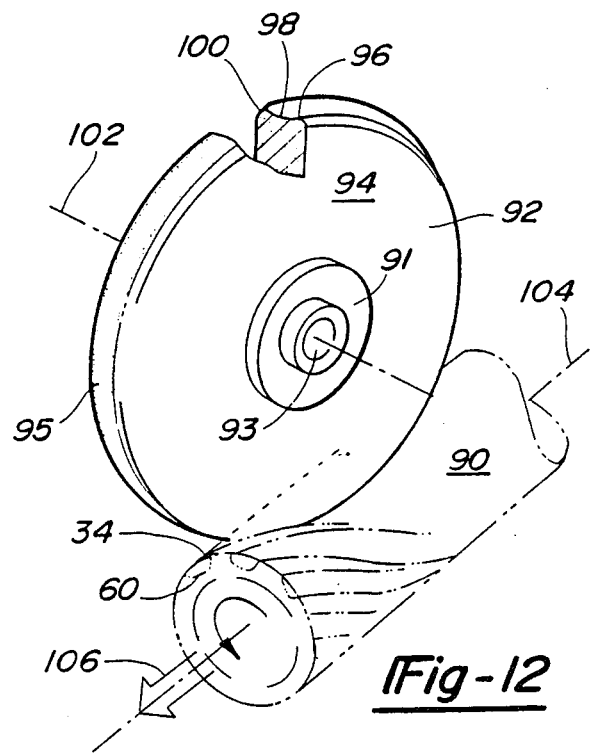
FIG. 12 illustrates a method of grinding the flutes and radial clearance into an annular cutter blank.

With reference to FIGS. 11 and 12, the method of manufacturing the preferred embodiment will now be described. A cutter blank 90 is provided having a tubular body portion ending in a shank configured to be mounted to a drill motor. The blank 90 is mounted in a spindle, and a grinding wheel 92 having a conventional hub 91 including an opening 93 is positioned with respect to the blank for forming the flutes 24, cutting edge 34, radial clearance 60, and leading wall 26. The grinding wheel has opposed faces 94 joined by a peripheral surface 95. The peripheral surface 95 is contoured including a raised or convex portion 96 ending in a radiused or concave portion 98 which ends in an angled portion 100. The raised portion is between about 0.015 and 0.020 inches in height, while the radiused portion 98 has a radius of between about 0.15 to 0.30 inches. The angled portion 100 is angled at approximately 45 degrees to the radiused portion 98. The raised or convex portion 96 forms the radial clearance 60 in the cutting tool while the radiused portion 98 forms the shoulder 62 and the angled portion 100 forms the leading wall 26 of flute 24. Side face 94 which is angled at 97, forms outer cutting edge 34.

It should be understood that the above preferred configuration of the grinding wheel is not intended to limit the scope of the invention. For example, the grinding wheel could be dressed so that the raised or convex surface 60 is not radiused but has sharp corners and straight sides defining a box-shaped clearance space in the shoulder. Further, the other shapes dressed into the grinding wheel could be modified and still remain within the scope of the invention.

By rotating the grinding wheel at high speed about its axis of rotation 102 on hub 91 and simultaneously rotating the blank 90 about its center line 104 at a slower speed and axially moving blank 90 in the direction indicated by arrow 106, the flute, radial clearance, leading and trailing side walls and radially outermost cutting edge are formed. Once these are formed, a second grinding wheel is employed to form notch 41 and gullet 42 to define inner cutting edge 32 and discharge passage 42 respectively.

Figure 7:
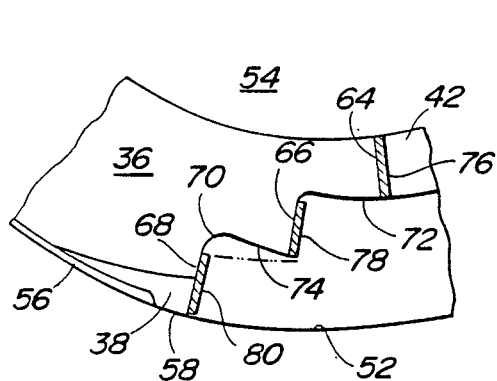
FIG. 7 is a partial end view of a further embodiment of the present invention.

A further embodiment of the present invention is illustrated in FIG. 7 wherein elements which are similar to previously defined elements have the same number designation. In this embodiment, there are three circumferentially spaced cutting edges including a radially innermost cutting edge 64, an intermediate inner cutting edge 66 and an outer cutting edge 68. Cutting edges 64 and 66 are separated by a shoulder 72 which has a slight relief to prevent the shoulder from rubbing the wall of the kerf formed by the inner cutting edge 66 as shown in U.S. Pat. No. Re 28,416. Cutting edges 66 and 68 are separated by a shoulder 74, and a radial clearance 70 is provided in shoulder 74 to accommodate the growth and radial movement of chip 80 as described above. Clearance space 70 works in the same manner as radial clearance 46 and 60.

The annular cutter of FIG. 7 is of the general type disclosed in applicant's U.S. Pat. No. 4,454,554 which is incorporated herein by reference. As should be apparent to those of ordinary skill in the annular cutter art, the annular cutter illustrated in FIG. 7 cuts three chips, each of which have a radial width less than the radial depth of flute 24. Irrespective of this relationship between the width of the chips and the flute depth, there is still a problem of wedging at the outermost cutting edge 68. The chip 80 cut at the outer edge 68 will grow in size when cut and wedge between shoulder 74 and the inner wall 52 of the hole. To eliminate this wedging, radius relief 70 is provided in shoulder 74. Regardless of the number of cutting edges on each tooth, there is always an outer cutting edge at which, unless provisions are made to permit unimpeded discharge of the chip, wedging will result. The present invention solves this difficult problem.

Figure 8:
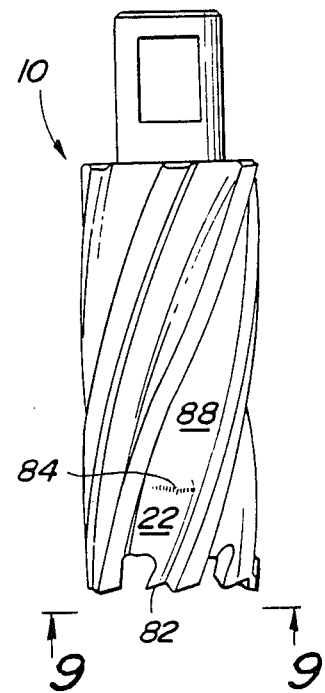
FIG. 8 is a plan view of a further embodiment of the present invention.
Figure 9:
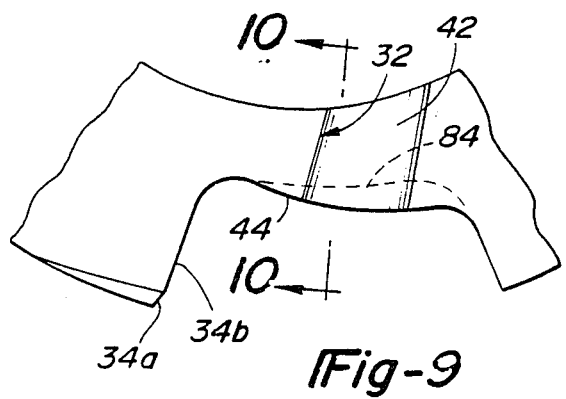
FIG. 9 is an end view of the annular cutter of FIG. 8 taken along line 9—9.
Figure 10:
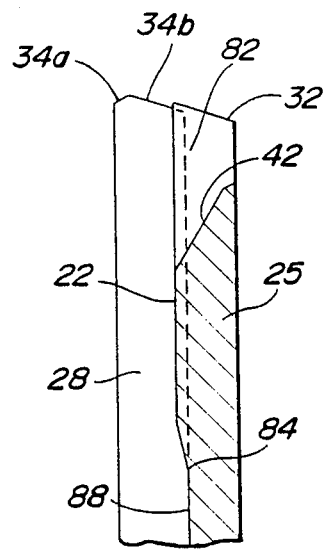
FIG. 10 is a partial side view of the annular cutter of FIG. 9 taken along line 10—10.
Figure 10A:
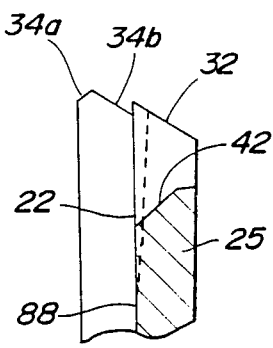
FIG. 10a is a further embodiment of the cutter illustrated in FIG. 10.

With reference to FIGS. 8-10, a further embodiment of the present invention is shown wherein similar elements have the same numerical designation as elements in previous embodiments. In this embodiment, a radial clearance 82 is formed in the shoulder 44 of the annular cutter 10, and the flute 22 is deepened at 84 such that it has the same radial depth as the radial clearance 82. This deepened portion of flute 22 is shown at 88 in FIGS. 8 and 10. Additionally, the flute can be gradually deepened rather than an abrupt deepening as at 84. See FIG. 10a. The flute is deepened at 84 to further facilitate the free and unobstructed discharge of chips. This embodiment is very beneficial when extremely deep holes are being formed in a workpiece which require chips to travel a longer distance before they are completely discharged.

With reference to FIGS. 13 and 14, a further embodiment of the present invention is illustrated. In this embodiment, the radially outermost corner of the inner cutting edge 42 has been beveled at 110. Bevel 110 is angled circumferentially rearwardly and axially upwardly from cutting edge 32. It has been found by Applicant that the outermost corner of the inner cutting edge 32 is exposed and susceptible to accelerated wear and breakage as described above. By beveling this corner, the exposed corner is eliminated and the possibility of the damage to the cutter substantially eliminated.

With respect to FIGS. 15 and 16, a stacked geometry cutter is illustrated. In this embodiment, the innermost cutting edge 112 is axially lower when viewed from the top of the annular cutter 10 than the radially outermost cutting edge 114. The configuration of FIGS. 15 and 16 is beneficial when cutting through stacks of material as described above. Without the innermost cutting edge 112 being axially lower than the outermost cutting edge 114, the cutter would not be able to penetrate stacked materials. As explained above, when the cutter breaks through the first workpiece of stacked workpieces, the slug is cut free and may rotate with the cutter which prevents the inner cutting edges from penetrating into the next workpiece. With the stacked geometry, no flange is formed on the axial slug.

In the preferred embodiment of the stacked cutter geometry of FIGS. 15 and 16, a back-off face 118 is provided. Back-off face 118 inclines rearwardly and upwardly at an angle of about 6 degrees and inclines radially outwardly at an angle of about 10 degrees. A shallow gullet 122 is formed at edge 112. This gullet can have an angle of as much as about 45 to 60 degrees from the vertical.

A radial clearance 125 is provided in shoulder 128 which separates cutting edges 112 and 114 to receive the growth and radial movement of the chip cut by edge 114. Prior to the present invention, the outer chip could not move away from the cutting edge because it would wedge between shoulder 128 and the inner wall 52 of the hole. Now, due to the radial clearance 125 of this invention, the chips move unimpeded out of the flutes 24. This results in less required horsepower, better finished holes and longer cutter life.

As should be apparent to those of ordinary skill in the art, the above-described invention is applicable to any annular cutter which has circumferentially spaced teeth which cut at least two separate chips. References have been made to applicant's own prior patents; however, the invention should not be in any way construed as limited to the configurations of those previously described cutters.

What is claimed is:

1. An annular cutter comprising a body portion having a plurality of teeth circumferentially spaced about the lower end thereof and a plurality of flutes extending upwardly in the outer periphery of said body portion between said teeth, said flutes being defined by leading and trailing side walls and a bottom wall, said teeth being configured to cut a plurality of chips which, when cut, are fed into said flutes and discharged;

said teeth having at least first leading and second trailing cutting edges generally radially and circumferentially separated by said bottom wall of said adjacent flute such that said first cutting edge leads said second cutting edge as said cutter is rotated with each cutting edge cutting a separate chip, said chips having a radial width when cut at least equal to the radial width of said respective cutting edges; and a radial clearance radially generally adjacent said second trailing cutting edge communicating with said adjacent flute receiving a portion of the radial width of said chip as said chip is formed by said trailing cutting edge facilitating the unobstructed feeding of said chip into said adjacent flute.

2. The annular cutter of claim 1, wherein said radial clearance extends upwardly from the bottom of said annular cutter.

3. The annular cutter of claim 1, wherein said radial clearance has a radial width of at least about 0.010 inches.

4. The annular cutter of claim 1, wherein said radial clearance extends axially upwardly from the bottom of said annular cutter with said flute having a first depth from the lower end of said cutter to a point between said lower and upper end of said cutter and a second depth form said point which is greater than said first depth and equal to the axial depth of said radial clearance.

5. The annular cutter of claim 1, wherein said first leading cutting edge has a radially outermost corner ending in a beveled surface.

6. The annular cutter of claim 1, wherein said leading cutting edge is axially lower than said trailing cutting edge as referenced from the top of the cutter along the length of the cutter axis.

7. The annular cutter of claim 1, wherein said leading cutting edge is axially higher than said trailing cutting edge as referenced from the top of the cutter along the length of the cutter axis.

8. An annular cutter comprising a body portion having a plurality of teeth circumferentially spaced about the lower end thereof and a plurality of flutes extending upwardly around the outer periphery of said body portion from the lower end thereof adjacent said teeth, said flutes being defined by leading and trailing side walls and a bottom wall, said teeth being configured to cut a plurality of chips which when cut are fed into said flutes to be discharged;

said teeth having at least an outer cutting edge and an adjacent inner cutting edge generally radially and circumferentially separated by a connecting wall extending generally circumferentially therebetween;

each of said cutting edges cutting a chip from said workpiece with each of said chips having a radial width when cut at least as wide as the radial width of said cutting edge and a circumferential thickness; and a relief channel extending radially into said connecting wall immediately adjacent said outer cutting edge, said relief channel having a radial width sufficient to accommodate the radial width of said chip as generated upon cutting, the expansion of said chip immediately upon being cut and radial movement of said chip as said cutter rotates and a circumferential depth sufficient to accommodate said circumferential thickness of said chip.

9. The annular cutter of claim 8, wherein said relief channel has a radial width of about at least about 0.010 inches.

10. The annular cutter of claim 8, wherein said relief channel extends axially upwardly from the bottom of said annular cutter with said flute having a first depth at said lower end of said cutter decreasing to a second depth which is greater than said first depth and about equal to the axial depth of said relief channel.

11. The annular cutter of claim 8, wherein said inner cutting edge has a radially outermost corner ending in a beveled surface.

12. The annular cutter of claim 8, wherein said inner cutting edge is axially lower than said outer cutting edge as referenced from the top of the cutter along the length of the cutter axis.

13. The annular cutter of claim 8, wherein said inner cutting edge is axially higher than said outer cutting edge as referenced from the top of the cutter along the length of the cutter axis.

14. An annular cutter comprising a body portion having a plurality of teeth circumferentially spaced about the lower end thereof and a plurality of flutes extending upwardly around the outer periphery of said body portion adjacent said teeth, said flutes being defined by leading and trailing side walls and a bottom wall, said teeth being configured to cut a plurality of chips which when cut are fed into said flutes to be discharged;

said teeth having at least first leading and second trailing cutting edges generally radially an circumferentially separated by a shoulder with said second trailing cutting edge being the outermost cutting edge, said first cutting edge leads said second cutting edge as said cutter is rotated with each cutting edge cutting a separate chip, said chips having a radial width when cut at least equal to the radial width of said respective cutting edge; and a clearance space radially adjacent said second trailing cutting edge extending into said shoulder communicating with said adjacent flute receiving a portion of the radial width of said chip as said chip is formed by said trailing cutting edge facilitating the unobstructed feeding of said chip into said adjacent flute.

15. The annular cutter of claim 14, wherein said clearance space has a radial width of about 0.015 and 0.020 inches.

16. The annular cutter of claim 14, wherein said clearance space extends axially upwardly from the bottom of said annular cutter with said flute having a first depth from the lower end of said cutter to a point between said lower and upper end of said cutter and a second depth from said point which is greater than said first depth and equal to the axial depth of said clearance space.

17. The annular cutter of claim 14, wherein said first leading cutting edge has a radially outermost corner ending in a beveled surface.

18. The annular cutter of claim 14, wherein said leading cutting edge is axially lower than said trailing cutting edge as referenced from the top of the cutter along the length of the cutter axis.

19. The annular cutter of claim 14, wherein said leading cutting edge is axially higher than said trailing cutting edge as referenced from the top of the cutter along the length of the cutter axis.

20. An annular cutter comprising a body portion having a plurality of teeth circumferentially spaced about the lower end thereof and a plurality of flutes extending upwardly around the outer periphery of said body portion between said teeth, said flutes being defined by leading and trailing side walls and a bottom wall, said teeth being configured to cut a plurality of chips which when cut are fed into said flutes to be discharged;

said teeth having at least first leading and second trailing cutting edges generally radially and circumferentially separated by said bottom wall of said adjacent flute such that said first cutting edge leads said second cutting edge as said cutter is rotated with each cutting edge cutting a separate chip, said chips having a radial width when cut at least equal to the radial width of said respective cutting edge; and a clearance space radially adjacent said second trailing cutting edge communicating with said adjacent flute receiving a portion of the radial width of said chip as said chip is formed by said trailing cutting edge facilitating the unobstructed feeding of said chip into said adjacent flute.

21. The annular cutter of claim 20, wherein said clearance space has a radial width of about 0.015 and 0.020 inches.

22. The annular cutter of claim 20, wherein said clearance space extends axially upwardly from the bottom of said annular cutter with said flute having a first depth at said lower end of said cutter decreasing to a second depth which is greater than said first depth and equal to the axial depth of said clearance space.

23. The annular cutter of claim 20, wherein said first leading cutting edge has a radially outermost corner ending in a beveled surface.

24. The annular cutter of claim 20, wherein said leading cutting edge is axially lower than said trailing cutting edge as referenced from the top of the cutter along the length of the cutter axis.

25. The annular cutter of claim 20, wherein said first leading cutting edge is axially higher than said trailing cutting edge as referenced from the top of the cutter along the length of the cutter axis.

* * * * *

UNITED STATES PATENT AND TRADEMARK OFFICE
CERTIFICATE OF CORRECTION

PATENT NO. : 4,871,287

DATED : October 3, 1989

INVENTOR(S) : Hougen, Everett D.

It is certified that error appears in the above-identified patent and that said Letters Patent is hereby corrected as shown below:

In claim 4, line 6, delete "form" and add --from--.

Signed and Sealed this

Twenty-seventh Day of November, 1990

Attest:

HARRY F. MANBECK, JR.

*Attesting Officer*   *Commissioner of Patents and Trademarks*